United States Patent
Shatters

(10) Patent No.: US 9,200,432 B1
(45) Date of Patent: Dec. 1, 2015

(54) METHOD AND SYSTEM FOR ESTIMATING PAYLOAD WEIGHT WITH HYDRAULIC FLUID TEMPERATURE COMPENSATION

(71) Applicant: Caterpillar Inc., Peoria, IL (US)

(72) Inventor: Aaron Shatters, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 8 days.

(21) Appl. No.: 14/299,419

(22) Filed: Jun. 9, 2014

(51) Int. Cl.
 *E02F 9/24* (2006.01)
 *E02F 3/36* (2006.01)
 *E02F 3/40* (2006.01)

(52) U.S. Cl.
 CPC ... *E02F 9/24* (2013.01); *E02F 3/36* (2013.01); *E02F 3/40* (2013.01)

(58) Field of Classification Search
 CPC .............. E02F 9/24; E02F 9/264; E02F 3/36; E02F 3/40; G01G 19/10; G01G 23/01
 See application file for complete search history.

(56) References Cited

U.S. PATENT DOCUMENTS

| | | | | |
|---|---|---|---|---|
| 5,285,020 A | * | 2/1994 | Jurca | 177/139 |
| 5,478,974 A | * | 12/1995 | O'Dea | 177/25.14 |
| 5,666,295 A | * | 9/1997 | Bruns | 702/174 |
| 5,780,783 A | * | 7/1998 | Heider et al. | 177/137 |
| 6,552,279 B1 | | 4/2003 | Lueschow et al. | |
| 2009/0127031 A1 | * | 5/2009 | Corder et al. | 187/393 |
| 2011/0036646 A1 | * | 2/2011 | Dack | 177/136 |
| 2012/0046908 A1 | * | 2/2012 | Campbell et al. | 702/174 |
| 2014/0060939 A1 | * | 3/2014 | Eppert | 177/1 |

FOREIGN PATENT DOCUMENTS

| | | |
|---|---|---|
| DE | 19706836 A1 | 9/1998 |
| EP | 0969271 A1 | 1/2000 |
| SU | 580460 A1 | 11/1977 |

* cited by examiner

*Primary Examiner* — James Trammell
*Assistant Examiner* — James E Stroud
(74) *Attorney, Agent, or Firm* — Leydig, Voit & Mayer, Ltd.

(57) ABSTRACT

A system for estimating the weight of a payload in a bucket of a machine is provided. The system includes a lift linkage supporting the bucket and a hydraulic lift cylinder assembly connected to the lift linkage. A pressure sensor is arranged remotely from the lift cylinder assembly. A payload measurement system is configured to monitor pressure data from the pressure sensor, hydraulic fluid temperature data and cylinder extension velocity data. The payload measurement system estimates a weight of the payload in the bucket based on the pressure data as adjusted by an estimate of a pressure drop between the lift cylinder assembly and the pressure sensor, the estimate of the pressure drop being determined based on a mathematical model that has been fitted to empirical data.

20 Claims, 4 Drawing Sheets

METHOD AND SYSTEM FOR ESTIMATING PAYLOAD WEIGHT WITH HYDRAULIC FLUID TEMPERATURE COMPENSATION

TECHNICAL FIELD

This patent disclosure relates generally to loader and, more particularly, to a method and system for estimating the payload weight of a loader.

BACKGROUND

A loader is a construction machine typically used to transport a load of material, such as aggregate construction or mining material, from one place, such as a pile of stored material, to another, such as a truck used for hauling the material to another location. For example, a loader may be used to load a dump truck full of material or to transport material from a pile to a specific place where it is used, such as trench. Typically, loaders are wheeled or tracked vehicles having a large bucket on one end and include hydraulics or other mechanisms for raising and lowering the bucket and tilting the bucket. However, a loader can also be a stationary machine that is immobile, but used to transport a load from one place to another, for example from a pile to the bed of a nearby dump truck. Generally, a loader is any device capable of using a bucket or other appropriate support structure to transport a payload from one place to another place.

Often, it is desirable to know the weight of a payload. For example, dump trucks used on the highway typically must abide by laws restricting how much weight they can carry and the restrictions are typically determined by a government highway authority. Depending on the density of the material loaded into a truck, it is possible to load more than the maximum allowed amount into the bed of the truck. In addition, loading too much weight into a truck can also cause premature wear to the truck's suspension, drive train, and other parts affected by weight. In other instances, it may be desirable to know the weight of the payload. For example, when material is sold according to weight, knowing an amount of material loaded into a truck can provide a basis to calculate a cost of the loaded material.

To determine the weight of a payload, loaders may include payload measurement systems. Typically, payload measurement systems utilize one or more sensors that measure the hydraulic pressures present in the hydraulic cylinders used for lifting the bucket up and down. The payload measurement systems then use the sensed pressures to estimate the weight of the payload in the bucket. One issue with such systems is that in order to produce the most accurate pressure data the pressure sensors should be arranged as close as possible to the hydraulic lift cylinders. However, when arranged at the hydraulic lift cylinders, the pressure sensors can be in an exposed position in which the sensors can be vulnerable to damage. For example, the pressure sensors can be damaged by falling debris associated with the loading process or can be damaged by water used to pressure wash the machine after use. Yet, if the sensors are located in a more protected position away from the hydraulic lift cylinders, the pressure readings the sensors produce can be inaccurate which results in inaccurate payload weight estimates.

SUMMARY

In one aspect, the disclosure describes a system for estimating the weight of a payload in a bucket of a machine. The system includes a pivotable lift linkage supporting the bucket and a lift cylinder assembly connected to the lift linkage. The lift cylinder assembly is configured to be movable by pressurized hydraulic fluid between extended and refracted positions for pivoting the lift linkage to move the bucket between raised and lowered positions. A pressure sensor is arranged remotely from the lift cylinder assembly and configured to provide pressure data relating to pressure in the lift cylinder assembly. A payload measurement system is configured to monitor the pressure data from the pressure sensor, temperature data relating to a temperature of the hydraulic fluid in the lift cylinder assembly and extension velocity data relating to velocity of extension of the lift cylinder assembly. The payload measurement system is configured to estimate a weight of the payload in the bucket based on the pressure data as adjust by an estimate of a pressure drop between the lift cylinder assembly and the pressure sensor. The payload measurement system is configured to determine the estimate of the pressure drop based on the temperature data, the extension velocity data and a mathematical model that has been fitted to empirical data relating to pressure loss between the lift cylinder assembly and the pressure sensor at different hydraulic fluid temperatures and lift cylinder assembly extension velocities.

In another aspect, the disclosure describes a method for estimating the weight of a payload in a machine. The machine includes a bucket, a lift linkage connected to the bucket, a lift cylinder assembly connected to the lift linkage and configured to be movable by pressurized hydraulic fluid between extended and retracted positions for pivoting the lift linkage, and a pressure sensor arranged remotely from the lift cylinder assembly and configured to provide pressure data relating to pressure in the lift cylinder assembly. The method includes the step of monitoring the pressure data from the pressure sensor. Temperature data relating to a temperature of the hydraulic fluid in the lift cylinder assembly is monitored. Extension velocity data relating to velocity of extension of the lift cylinder assembly is monitored. An estimate of the pressure drop between the lift cylinder assembly and the pressure sensor is determined based on the temperature data, the extension velocity data and a mathematical model that has been fitted to empirical data relating to pressure loss between the lift cylinder assembly and the pressure sensor at different hydraulic fluid temperatures and lift cylinder assembly extension velocities. The pressure data is adjusted with the estimate of the pressure drop and the weight of the payload in the bucket is estimated using the pressure data as adjusted by the estimate of the pressure drop.

In yet another aspect, the disclosure describes a machine including a chassis, a bucket for holding a payload, and a lift linkage pivotally attached to the chassis and to the bucket. A lift cylinder assembly is connected to the chassis and the lift linkage and configured to be movable by pressurized hydraulic fluid between extended and refracted positions for pivoting the lift linkage to move the bucket between raised and lowered positions. A pressure sensor is arranged remotely from the lift cylinder assembly and configured to provide pressure data relating to pressure in the lift cylinder assembly. A payload measurement system monitors the pressure data from the pressure sensor, temperature data relating to a temperature of the hydraulic fluid in the lift cylinder assembly and extension velocity data relating to velocity of extension of the lift cylinder assembly. The payload measurement system is configured to estimate the weight of a payload in the bucket based on the pressure data as adjusted by an estimate of a pressure drop between the lift cylinder assembly and the pressure sensor. The payload measurement system is configured to determine the estimate of the pressure drop based on the temperature data, the extension velocity data and a mathematical model that has been fitted to empirical data relating to pressure loss between the lift cylinder assembly and the pressure sensor at different hydraulic fluid temperatures and lift cylinder assembly extension velocities.

DETAILED DESCRIPTION

Figure 1:
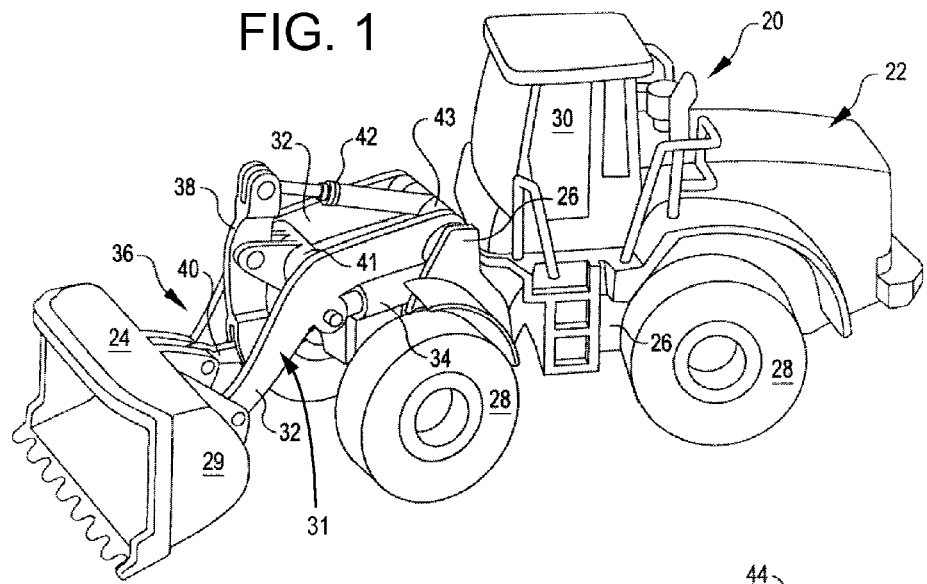
FIG. 1 is a side perspective view of a loader according to the present disclosure.

This disclosure generally relates to a method and system for estimating the weight of a payload carried by a loader. With particular reference to FIG. 1, an exemplary embodiment of a loader 20 is shown. The illustrated loader 20 includes a vehicle portion 22 and a bucket 24 connected on a front side of the vehicle portion 22. The vehicle portion 22 may include a chassis 26 which may support various parts of the loader 20, either directly or indirectly, such as an engine, body panels, hydraulic systems, and other parts. In the illustrated embodiment, the chassis 26 itself is supported by a plurality of wheels 28 rotatably connected to the chassis 26. The vehicle portion 22 may include a cab 30 attached to an upper middle section of the chassis 26. The cab 30 may be an enclosed structure having windows on lateral sides and in which an operator of the loader 20 may sit and operate the loader 20. In other embodiments, the loader may be configured to be operated from a remote location.

Figure 2:
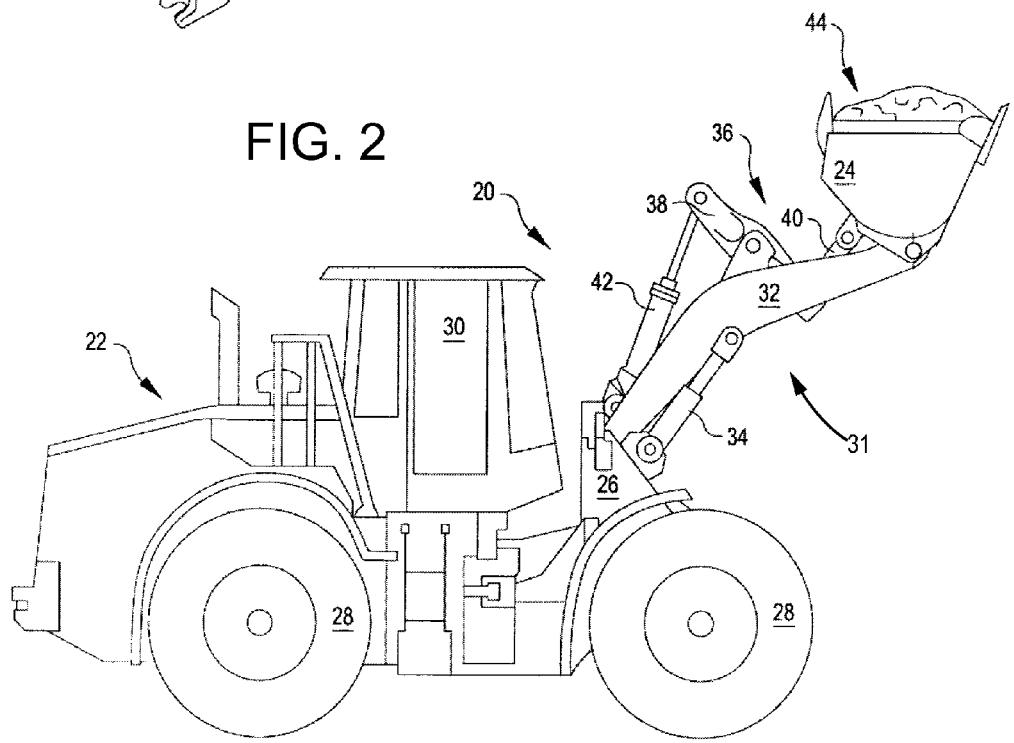
FIG. 2 is a side view of the loader of FIG. 1 with the bucket in a raised position.

In the illustrated embodiment, the bucket 24 comprises two parabolic or similarly-shaped plates 29 having a plate curved about the perimeter of each plate and extending horizontally between them so as to form a concave enclosure opening away from the loader 20. In general, the bucket may have any shape capable of holding a payload. FIG. 2 shows the loader 20 with a payload 44 in the bucket 24 and the bucket 24 in a raised position.

For lifting the bucket, the bucket 24 may be attached to the vehicle portion 22 by a lift linkage 31 comprising a pair of parallel arms 32. The parallel arms may extend between the bucket 24 and the chassis 26, such as between a rear portion of the bucket 24 and a location on the chassis 26 immediately in front of the cab 30. Each arm 32 may be pivotally attached to the chassis 26 at one end, and pivotally attached to a rear portion of the bucket 24 on an opposite end. For each arm 32, a hydraulic lift cylinder assembly 34 or other actuator for pivoting the arm 32 relative to the chassis 26 is provided that may have a first end pivotally attached to the chassis 26 beneath the arm 32 and a second end pivotally attached to the arm 32 at a point between the bucket 24 and the location of the attachment of the arm 32 to the chassis 26.

The lift cylinder assembly 34 may be configured such that extension and retraction of the lift cylinder pivots the lift linkage thereby moving the bucket 24 between raised (see FIG. 2) and lowered positions (see FIG. 2). More specifically, the lift cylinder assembly 34 may include an actuator—such as a hydraulic cylinder including a rod enclosed by a casing, the rod able to extend out of or retract into the casing—able to increase and decrease its length, thereby causing its respective arm 32 to pivot upwardly about its respective attachment to the chassis 26, or retracting its length thereby forcing the arm 32 to rotate downwardly about its attachment to the chassis 26. As the arms 32 rotate about their respective attachments to the chassis 26, the bucket 24 is raised and lowered accordingly. In general, any actuator or other mechanism capable of lifting the arms 32 may be used as an alternative to or in addition to the lift cylinder assemblies 34.

Figure 3:
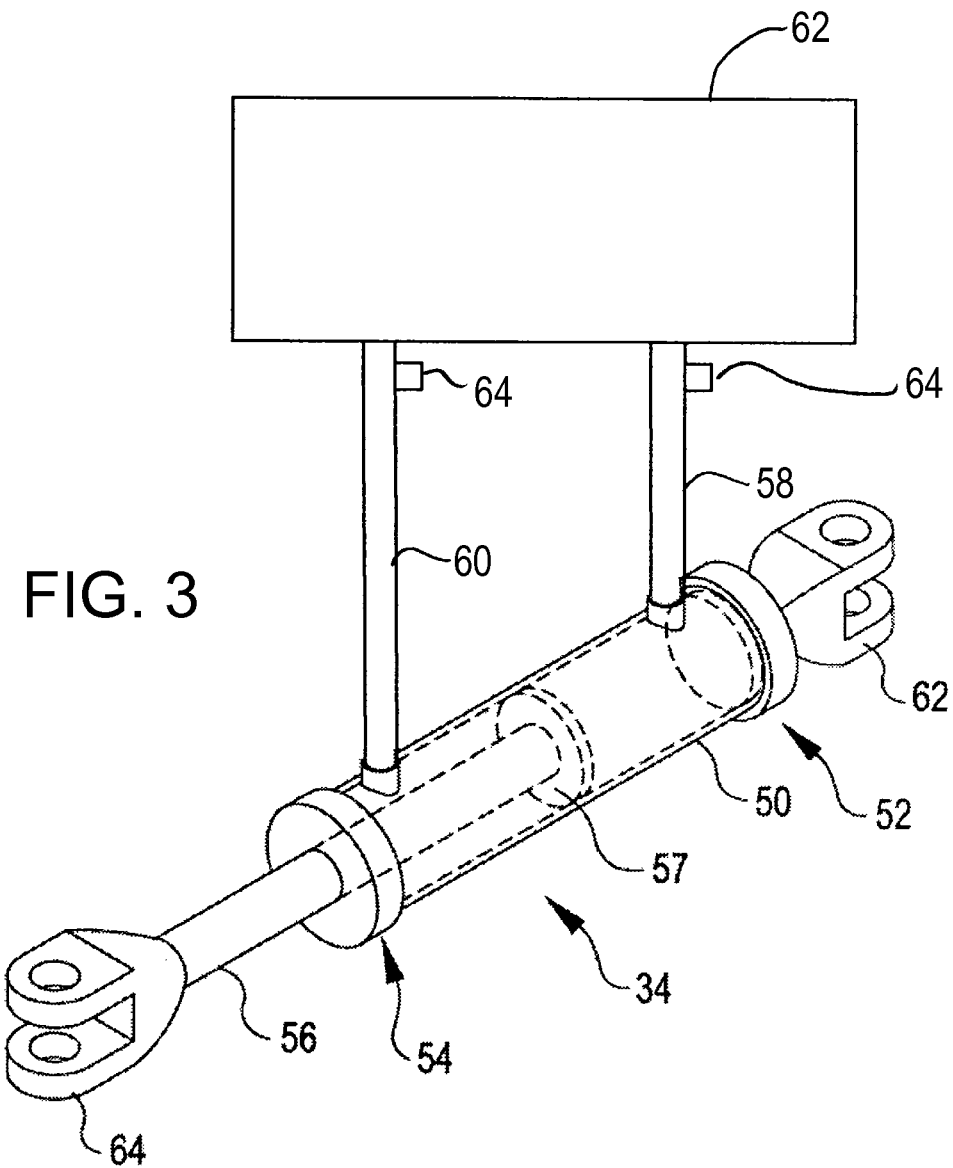
FIG. 3 is a schematic, side perspective view of a hydraulic cylinder of the loader of FIG. 1.

FIG. 3 shows a representation of an exemplary lift cylinder assembly 34. The lift cylinder assembly 34 includes a hollow casing 50 with a capped head-end 52 and a rod-end 54 through which an elongate rod 56 extends. In this case, a hydraulic head-end hose 58 is fluidly connected to the interior of the casing 50 at the head-end 52, while a hydraulic rod-end hose 60 is fluidly connected to the interior of the casing 50 at the rod-end 54. The end of the rod 56 inside the casing 50 includes a plunger 57 having a cross section approximately equal to the interior diameter of the casing 50 so as to fit tightly inside the interior of the casing 50. In this manner, a pressure differential across the head-end hose 58 and rod-end hose 60 can cause the rod 56 to move relative to the casing 50. For instance, if there is higher pressure in the head-end hose 58 than in the rod-end hose 60, hydraulic fluid will force the plunger 57 towards the rod-end 54 of the cylinder 34, thereby causing the rod 56 to exit the casing 50 about its length. Hydraulic fluid in the rod-end 54 of the lift cylinder assembly 34 exits the rod-end 54 through the rod-end hose 60. Similarly, if the pressure in the rod-end hose 60 is higher than in the head-end hose 58, the plunger 57 is forced into the casing 50 away from the rod-end 54 towards the head-end 52 causing the rod 56 to retract into the casing 50.

For varying the angular position of the bucket 24 relative to the arms 32, the bucket 24 may be connected to the arms 32 by a tilt linkage 36. In particular, the tilt linkage may be configured to be operable to pivot the bucket 24 relative to the lift linkage 31 about an axis defined by its pivotal connection to the lift linkage. The tilt linkage 36 may include a major tilt arm 38 and a minor tilt arm 40. The major tilt arm 38 may be rotatably connected at its middle portion to a first cross member 41 that extends horizontally between the corresponding middle portions of the arms 32. A hydraulic tilt cylinder assembly 42 or other actuator for actuating the angular position of the bucket 24 relative to the arms 32 may rotatably connect an upper end of the major tilt arm 38 to a cross member 43 of the chassis 26 that extends between the arms 32 near their connections to the chassis 26. Like the lift cylinder assembly 34, the tilt cylinder assembly 42 may include an actuator able to increase and decrease its length, thereby rotating the major tilt arm 38 about its connection to the first cross member 41. The tilt cylinder assembly 42 may be functionally identical to the lift cylinder assembly 34, although it may have different dimensions such as a different length or diameter. Consequently, reference numerals for the lift cylinder assembly 34 will be used to reference respective parts of the tilt cylinder assembly 42.

As best shown in FIGS. 1 and 2, the end of the major tilt arm 38 opposite the tilt cylinder assembly 42 may be connected to the bucket 24 by the minor tilt arm 40, which extends from and rotatably connects to a rear portion of the bucket 24 above the connections of the bucket 24 to the arms 32. According to one embodiment, when the tilt cylinder assembly 42 extends, the tilt linkage 36 causes the bucket 24 to pivot relative to the lift linkage 31 with a lower front edge of the bucket 24 rotating upwardly. Similarly, when the tilt cylinder assembly 42 retracts, the tilt linkage 36 causes the bucket 24 to tilt with the lower front edge of the bucket 24 rotating downwardly.

To direct hydraulic fluid to and from the lift cylinder assembly 34, one or more control valves 62 may be provided that are hydraulically coupled to the lift cylinder assembly as shown schematically in FIG. 3. More specifically, the control valves 62 may control the flow of pressurized hydraulic fluid to and from the head end 52 and rod end 54 of the lift cylinder assembly 34. The control valves 62 may also direct hydraulic fluid to and from the tilt cylinder assembly 42. The control valves 62 may be arranged within an enclosure that is supported on the chassis 26 of the machine. For the purposes of this disclosure, the "control valves 62" may include one or more hydraulic valves that control and direct hydraulic flow to and from the lift cylinder assembly 34 and/or the tilt cylinder assembly.

Data associated with the bucket 24 and the payload 44 may be gathered through sensors on the linkage connecting the bucket 24 to the chassis 26, such as through sensors associated with the lift cylinder assembly 34. For example, pressures inside of the head-end 52 and rod-end 54 of each lift cylinder assembly 34 may be determined by taking measurements from a suitable pressure sensor as described in greater detail below. Likewise, the displacement of the rod 56 of each the lift cylinder assembly 34 and tilt cylinder assembly 42 can also be measured by appropriate sensors. For example, the plunger 57 may include a magnetic element that is sensed by a sensor (not shown) located on the casing 50. The sensor may include several sensing elements that react when the magnetic element is in close proximity, thereby indicating the location of the magnetic element relative to the casing 50 and, therefore, the displacement of the rod 56 relative to the casing 50. Generally, any mechanism or mechanisms for measuring the head-end 52 and rod-end 54 pressures, and rod 56 displacement can be used.

In addition, the loader 20, as shown, includes two identical lift cylinder assemblies 34 that act in concert to raise and lower the arms 32. Consequently, pressure and displacement measurements need only be taken from one of the lift cylinder assemblies 34 in order to provide data about the bucket 24. Nevertheless, pressure and/or displacement measurements can be taken for both lift cylinder assemblies 34 in order to increase the accuracy of the measurements taken. For instance, if the loader 20 is on an uneven surface, the head-end 52 pressures in each lift cylinder assembly 34 can be unequal and the pressures can be averaged or otherwise used. In addition, taking measurements from more than one lift cylinder assembly 34 also can be used in order to provide redundancy so that sensors for one lift cylinder assembly 34 provide a reference against which to check the function of sensors of the other lift cylinder assembly 34 and so that, should sensors in one lift cylinder assembly 34 fail, sensors in the other lift cylinder assembly 34 can be used.

Figure 4:
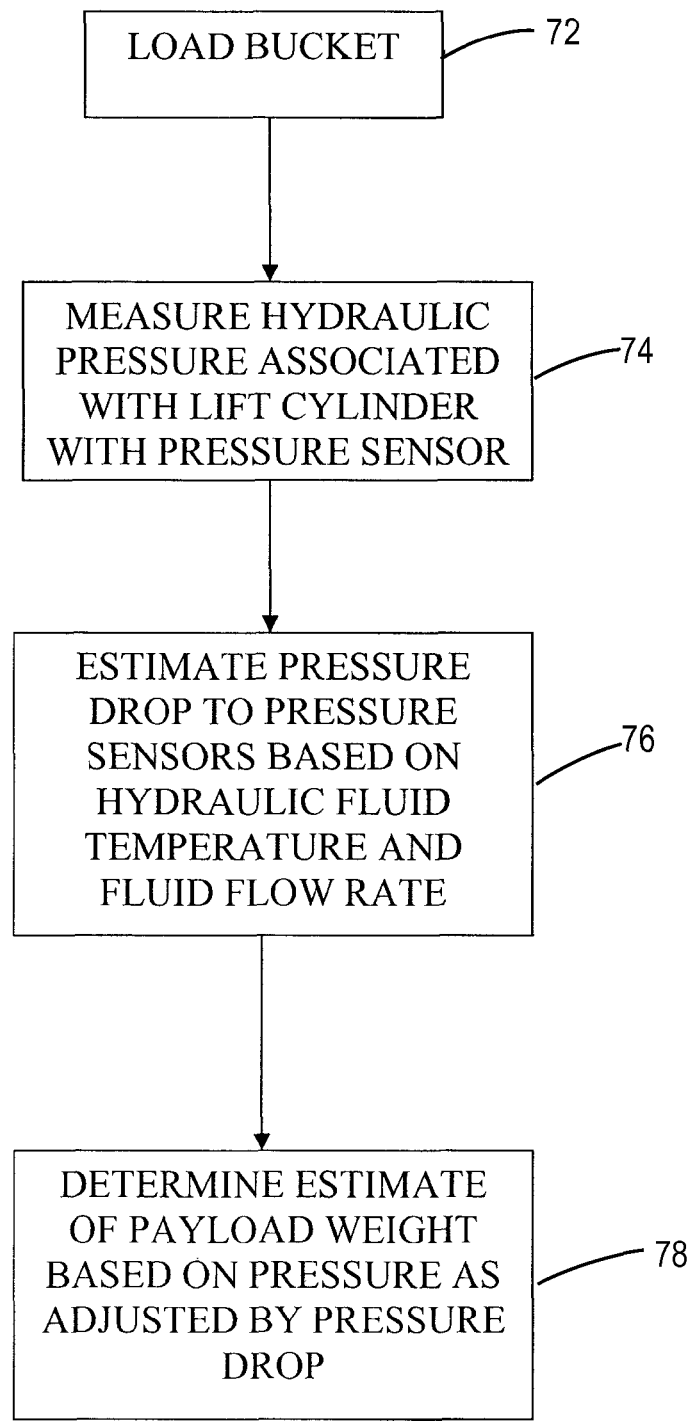
FIG. 4 is a schematic flow diagram of an exemplary method for estimating the weight of a payload in a bucket of a loader according to the present disclosure.

FIG. 4 shows a schematic flow diagram of steps performed by a payload measurement system 70 to estimate the weight of the payload 44. It will be appreciated that each program, module, and functional computational unit described herein, and each step executed by the system 70, is implemented in an embodiment by a computer or computing device (generically "computer") using one or more processors to read computer-executable instructions from a computer-readable medium and executing said instructions or causing them to be executed. The computer-readable medium is a physical fixed medium such as a magnetic or optically readable (and potentially writable) disc, circuit, array, or other physically tangible element. In an alternative embodiment, "transient computer-readable media" may be used additionally or alternatively. Such media include radio and optical transmissions (generically "electromagnetic transmissions"), audio transmissions, whether human-perceivable or not, and so on. It will be appreciated that "computer-readable media" are distinct from "transient computer-readable media."

The payload measurement system 70 begins the weight estimation at a loading step 72 during which an operator of the loader 20 loads the payload 44 into the bucket 24. Typically, loading the payload 44 into the bucket 24 involves lowering the bucket 24 to the ground and tilting the bucket 24 so that a bottom edge of the bucket 24 is approximately parallel to the ground. An operator of the loader 20 drives the loader 20 toward a pile of material such as gravel, rock, dirt or other material with the bucket 24 in this configuration and gradually lifts the arms 32 and curls the bucket 24 as the bucket enters the pile, thereby causing gravel in the pile to be scooped by the bucket 24. However, other ways of loading the payload 44 into the bucket 24 can also be practiced, such as loading the payload 44 into the bucket 24 manually using hand shovels or by dropping the payload 44 into the bucket 24 using another machine, such as an excavator. Generally, any method of loading a payload 44 into the bucket 24 can be used.

Once the payload 44 is loaded into the bucket 24, the payload measurement system may monitor data relating to the pressure in the lift cylinder assembly 34 from one or more pressure sensors 64 (shown in FIG. 3) in step 74. The pressure sensors 64 may be arranged (such as in communication with the lines communicating to the head and rod ends 52, 54 of the lift cylinder assembly 34) and configured so as produce data relating to pressure in the lift cylinder assembly 34. As shown schematically in FIG. 3, the pressure sensors 64 may be arranged remotely from the lift cylinder assembly 34, such as in a location near the control valves 62 (including within the enclosure containing the control valves 62), and be configured so as to produce pressure data. Such a location may place the sensors 64 within the chassis 26 of the machine so as to provide the sensors with protection against environmental hazards such as water and debris associated with the application in which the machine is being used. The pressure sensors 64 may be provided at any location remote from the lift cylinder assembly 34 that provides sufficient protection to the sensors. In the illustrated embodiment, a pressure sensor 64 is provided for each of the head end 52 and the rod end 54 of the lift cylinder assembly 34. Such an arrangement may provide more accurate data regarding the force being produced by the lift cylinder assembly 34 as compared to an arrangement in which a pressure sensor is only provided for the head end 52 of the lift cylinder assembly 34. However, the present disclosure is also applicable to arrangements having a pressure sensor for only the head end 52 or the rod end 54 of the lift cylinder assembly 34.

Because the sensors 64 are not located at the lift cylinder assembly 34, the pressure data produced by the sensors 64 may not accurately represent the pressure at the lift cylinder assembly 34. In particular, there may be a pressure drop between the lift cylinder assembly 34 and the point in the system where the pressure sensors 64 are arranged. Accordingly, the payload measurement system 70 may be configured to determine an estimate of the pressure drop between the lift cylinder assembly 34 and the pressure sensors 64 as shown in step 76 of FIG. 4. More particularly, the payload measurement system 70 may estimate the pressure drop using data relating to the temperature of the hydraulic fluid as well as data relating to the rate of hydraulic fluid flow between the lift cylinder assembly 34 and the control valve 50.

The payload measurement system 70 may be configured to monitor data relating to temperature of the hydraulic fluid used in the lift cylinder assembly 34 such as provided by appropriate sensors provided in the hydraulic system. For example, the payload measurement system 70 may be in communication with a temperature sensor arranged at a hydraulic fluid tank for the hydraulic system of the machine. The temperature of the hydraulic fluid in the tank provides an adequate approximation for purposes of this disclosure of the temperature of the fluid as it travels between the pressure sensors 64 and the tilt cylinder assembly 34. It will be understood that the temperature of the hydraulic fluid may be monitored by the payload measurement system 70 at other locations and in other ways as well. For providing data relating to the hydraulic fluid flow rate between the lift cylinder assembly 34 and the control valves 62, the payload measurement system may be in communication with appropriate sensors monitoring the velocity at which the lift cylinder assembly is extending. For example, such data may be provided by displacement sensors associated with the lift cylinder assembly 34. As understood by those skilled in the art, such data can be used along with the physical parameters of lift cylinder assembly 34 to calculate the hydraulic fluid flow rate. Other arrangements can also be used to produce data relating to the hydraulic fluid flow rate and/or lift cylinder extension velocity.

After determining an estimate of the pressure drop in step 76, the payload measurement system 70 in step 78 may determine an estimate of the weight of the payload in the bucket 24 based on the pressure data relating to the lift cylinder assembly 34 as adjusted for the pressure drop between the pressure sensors 64 and the lift cylinder assembly 34. The estimate of the payload weight may be further based on the extension of one or both of the lift cylinder assemblies, i.e. displacement of the rods 56 of the lift cylinder assembly 34. The system 70 may convert the measured lift cylinder assembly 34 pressures (as adjusted for the pressure drop) and into an estimated weight by referencing the pressures and positions measured in a table stored electronically in the system 70. However, the payload measurement system 70 may also use formulas derived from geometric properties of the loader 20. Other methods for translating measured physical data relating to lift cylinder pressure into an estimated weight could also be used. Tables stored electronically in the payload measurement system 70 can be determined empirically, using measurements taken with payloads of known weight or by the use of well-known physical formulas.

Figure 5:
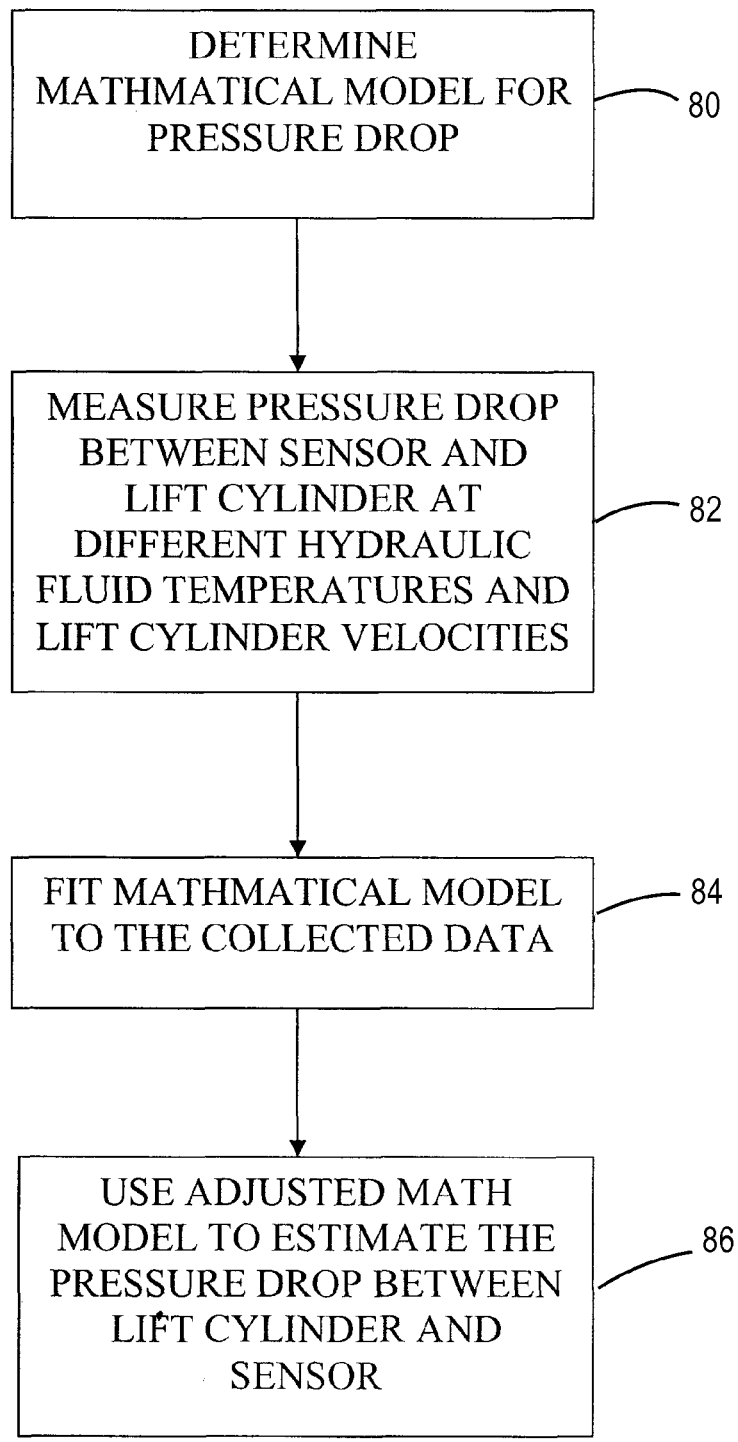
FIG. 5 is a schematic flow diagram of an exemplary method for compensating a payload weight estimate for the pressure drop to a pressure sensor based on hydraulic fluid temperature.

A more detailed example of a method for estimating the pressure drop between the lift cylinder assembly 34 and the pressure sensors 64 is shown in the schematic flow diagram of FIG. 5. The payload measurement system 70 may be configured to use the pressure drop model that results from the method shown in FIG. 5. In a first step 80, a mathematical model for the pressure drop is determined. In one example, the mathematical model may be based on a hydraulic line being arranged in series with an orifice in between the lift cylinder assembly 34 and the pressure sensors 64. In such a model, the pressure drop (ΔP) may be represented as the sum of the pressure drop through the orifice (ΔP$_O$), the pressure drop through the line (ΔP$_L$) and the pressure drop resulting from the pressure sensor (ΔP$_C$):

$$\Delta P = \Delta P_O + \Delta P_L + \Delta P_C$$

This model may be applied to determine the pressure drop from the lift cylinder assembly 34 to both the pressure sensor 64 associated with the head end 52 of the cylinder and the pressure sensor 64 associated with the rod end 54 of the lift cylinder assembly 34. In such a case, the model would be used twice, once for each sensor. In some embodiments, the pressure drop resulting from the pressure sensor (ΔP$_C$) may be assumed to be zero.

The pressure drops through the orifice and the line and the sensor offset may be represented by the following equations in which the R is the effective radius of the one or more hydraulic lines that extend between the sensors 64 and the lift cylinder assembly 34, l is the length of the line between the sensors 64 and the lift cylinder assembly:

$$\Delta P_O = \frac{\rho Q^2}{2 C_d^2 \pi^2 R^4}$$

$$\Delta P_L = \frac{8 K_g \mu Q l}{\pi R^4}$$

$$\Delta P_C = C$$

In the equations above, ρ is density of the hydraulic fluid and μ is the viscosity of the hydraulic fluid both of which are dependent on the temperature of the hydraulic fluid. Additionally, Q is the volumetric flow rate of the hydraulic fluid in the line between the sensors 64 and the lift cylinder assembly 34.

$C_d$, $K_g$ and C in the above equations are coefficients the value of which can be determined via steps 82 and 84. In step 82, data is collected from a series of empirical measurements made of the hydraulic fluid pressures at the lift cylinder assembly 34 and the sensors 64 or control valve 62 at different hydraulic fluid temperatures and lift cylinder velocities. This step may include measurement of the pressure in both the head end 52 and the rod end 54 of the lift cylinder assembly 34. In step 84, the theoretical mathematical model of the pressure drop from step 80 is fit to the empirical data collected in step 82. Fitting the data from the empirical results from step 82 to the model from step 80 tunes the mathematical model to match the observed performance of the lift cylinder assembly 34, control valve 62 and sensors 64. More particularly, the coefficients $C_d$, $K_g$ and C from the equations above may be determined by using a regression analysis to fit the model from step 80 to the data collected in step 82 to enable extrapolation to hypothetical operating conditions. As noted above, this determination may be performed separately for the sensor 64 associated with the head end 52 of the lift cylinder assembly 34 and the sensor 64 associated with the rod end 54 of the lift cylinder assembly 34.

In step 86 of FIG. 5, the adjusted mathematical model is used to estimate the pressure drop between the lift cylinder assembly 34 and the sensors 64. To this end, the payload measurement system 70 may be programmed with the tuned mathematical model and the system may be configured so as to use the model when estimating the pressure drop from the lift cylinder assembly 34 to the pressure sensors 64 such as in step 76 of the method of FIG. 4. The pressure drop from the tuned mathematical model can then be used by the payload measurement system to adjust the data from the pressure sensors 64 located remotely from the lift cylinder assembly 34 before the system uses the pressure data to estimate of the weight of the payload carried by the bucket 26.

INDUSTRIAL APPLICABILITY

The present disclosure is applicable to any loader used in an application in which it would be useful to know the weight of a payload carried by the loader. The payload measurement system of the present disclosure allows the pressure sensors associated with the lift cylinders to located remotely from the lift cylinders in a protected location while still producing an accurate estimate of the payload weight by compensating for the pressure drop to the sensors based on the temperature of the hydraulic fluid and the velocity of the lift cylinder.

In a typical situation, the loader 20 is used to transfer aggregate material, such as gravel, rock or dirt, from a stockpile to a truck used for transporting the material to another location. As described above, it is often desirable to know the weight of the material loaded onto the truck. For example, several factors may limit the amount of material that can be loaded onto the truck and/or the loaded material may be sold according to weight. Generally, an operator of the loader 20 scoops several bucket loads of material and dumps the material over sideboards of the truck into a bed of the truck until the desired amount of material is loaded onto the truck.

When the operator scoops material into the bucket 24 of the loader 20 and brings the bucket 24 into a position for loading onto the truck, the payload measurement system 70 may produced an estimate of the payload weight that then may be displayed to an operator of the machine. Other items may also be displayed to the operator of the loader 20, such as the cumulative weight loaded onto the truck, or loaded since a particular point in time. By knowing the weight of the payload 44, the operator of the loader 20 can determine whether to continue loading the truck. For example, if the operator knows that a particular truck is certified to carry ten tons of material in addition to the weight of the truck on public roads, the operator can determine how much weight he or she has already loaded onto the truck at a given time and how much weight he or she can load into the truck at any given time. As another example, if a customer has ordered more material than can be loaded into one truck, such as 1000 tons, the operator of the loader 20 can load several trucks until the operator sees that he or she has loaded the total weight ordered into the several trucks.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A system for estimating the weight of a payload in a bucket of a machine, the system comprising:
    a pivotable lift linkage supporting the bucket;
    a lift cylinder assembly connected to the lift linkage and configured to be movable by pressurized hydraulic fluid between extended and retracted positions for pivoting the lift linkage to move the bucket between raised and lowered positions;
    a pressure sensor arranged remotely from the lift cylinder assembly and configured to provide pressure data relating to pressure in the lift cylinder assembly; and
    a payload measurement system configured to monitor the pressure data from the pressure sensor, temperature data relating to a temperature of the hydraulic fluid in the lift cylinder assembly and extension velocity data relating to velocity of extension of the lift cylinder assembly, the payload measurement system being configured to estimate a weight of the payload in the bucket based on the pressure data as adjusted by an estimate of a pressure drop between the lift cylinder assembly and the pressure sensor, the payload measurement system being configured to determine the estimate of the pressure drop based on the temperature data, the extension velocity data and a mathematical model that has been fitted to empirical data relating to pressure loss between the lift cylinder assembly and the pressure sensor at different hydraulic fluid temperatures and lift cylinder assembly extension velocities.

2. The system of claim 1 wherein the mathematical model has been fit to the empirical data using a regression analysis.

3. The system of claim 1 wherein the payload measurement system determines the estimate of the weight of the payload from a table stored in the payload measurement system using the pressure data as adjusted by the pressure loss data.

4. The system of claim 1 wherein the mathematical model uses an equation including:

$$\Delta P_O = \frac{\rho Q^2}{2 C_d^2 \pi^2 R^4}$$

where $\Delta P_O$ is a pressure drop through a orifice between the pressure sensor and the lift cylinder assembly,
    $\rho$ is density of the hydraulic fluid,
    Q is the volumetric flow rate of the hydraulic fluid between the pressure sensor and the lift cylinder assembly,
    R is the radius of a hydraulic line between the pressure sensor and the lift cylinder assembly, and
    $C_d$ is a coefficient the value of which is determined by fitting the empirical data to the mathematical model.

5. The system of claim 1 wherein the mathematical model uses an equation including:

$$\Delta P_L = \frac{8 K_g \mu Q l}{\pi R^4}$$

wherein $\Delta P_L$ is a pressure drop through a line between the pressure sensor and the lift cylinder assembly,
    $\mu$ is the viscosity of the hydraulic,
    Q is the volumetric flow rate of the hydraulic fluid between the pressure sensor and the lift cylinder assembly,
    R is the radius of a hydraulic line between the pressure sensor and the lift cylinder assembly,
    l is the length of the line between the pressure sensor and the lift cylinder assembly, and
    $K_g$ is a coefficient the value of which is determined by fitting the empirical data to the mathematical model.

6. The system of claim 1 wherein the mathematical model uses an equation including:

$$\Delta P_C = C$$

where $\Delta P_C$ is a pressure drop resulting from the pressure sensor, and

C is a coefficient the value of which is determined by fitting the empirical data to the mathematical model.

7. The system of claim 1 wherein the pressure sensor is located adjacent a control valve for the lift cylinder assembly.

8. A method for estimating by a payload measurement system, the weight of a payload in a machine, the machine including a bucket, a lift linkage connected to the bucket, a lift cylinder assembly connected to the lift linkage and configured to be movable by pressurized hydraulic fluid between extended and retracted positions for pivoting the lift linkage, and a pressure sensor arranged remotely from the lift cylinder assembly and configured to provide pressure data relating to pressure in the lift cylinder assembly, the method comprising the steps of: monitoring the pressure data from the pressure sensor; monitoring temperature data relating to a temperature of the hydraulic fluid in the lift cylinder assembly; monitoring extension velocity data relating to velocity of extension of the lift cylinder assembly; determining an estimate of the pressure drop between the lift cylinder assembly and the pressure sensor based on the temperature data, the extension velocity data and a mathematical model that has been fitted to empirical data relating to pressure loss between the lift cylinder assembly and the pressure sensor at different hydraulic fluid temperatures and lift cylinder assembly extension velocities; and adjusting the pressure data with the estimate of the pressure drop; and estimating the weight of the payload in the bucket using the pressure data as adjusted by the estimate of the pressure drop.

9. The method of claim 8 wherein the mathematical model has been fit to the empirical data using a regression analysis.

10. The method of claim 8 wherein the step of estimating the weight of the payload includes looking up an estimated weight from a table stored in a payload measurement system using the pressure data as adjusted by the pressure loss data.

11. The method of claim 8 wherein the mathematical model uses an equation including:

$$\Delta P_O = \frac{\rho Q^2}{2C_d^2 \pi^2 R^4}$$

where $\Delta P_O$ is a pressure drop through a orifice between the pressure sensor and the lift cylinder assembly, $\rho$ is density of the hydraulic fluid, Q is the volumetric flow rate of the hydraulic fluid between the pressure sensor and the lift cylinder assembly, R is the radius of a hydraulic line between the pressure sensor and the lift cylinder assembly, and $C_d$ is a coefficient the value of which is determined by fitting the empirical data to the mathematical model.

12. The method of claim 8 wherein the mathematical model uses an equation including:

$$\Delta P_L = \frac{8K_g \mu Q l}{\pi R^4}$$

wherein $\Delta P_L$ is a pressure drop through a line between the pressure sensor and the lift cylinder assembly, $\mu$ is the viscosity of the hydraulic, Q is the volumetric flow rate of the hydraulic fluid between the pressure sensor and the lift cylinder assembly, R is the radius of a hydraulic line between the pressure sensor and the lift cylinder assembly, l is the length of the line between the pressure sensor and the lift cylinder assembly, and $K_g$ is a coefficient the value of which is determined by fitting the empirical data to the mathematical model.

13. The method of claim 8 wherein the mathematical model uses an equation including:

$$\Delta P_C = C$$

where $\Delta P_C$ is a pressure drop resulting from the pressure sensor, and

C is a coefficient the value of which is determined by fitting the empirical data to the mathematical model.

14. A machine comprising:
a chassis;
a bucket for holding a payload;
a lift linkage pivotally attached to the chassis and to the bucket;
a lift cylinder assembly connected to the chassis and the lift linkage and configured to be movable by pressurized hydraulic fluid between extended and retracted positions for pivoting the lift linkage to move the bucket between raised and lowered positions;
a pressure sensor arranged remotely from the lift cylinder assembly and configured to provide pressure data relating to pressure in the lift cylinder assembly; and
a payload measurement system configured to monitor the pressure data from the pressure sensor, temperature data relating to a temperature of the hydraulic fluid in the lift cylinder assembly and extension velocity data relating to velocity of extension of the lift cylinder assembly, the payload measurement system being configured to estimate a weight of the payload in the bucket based on the pressure data as adjusted by an estimate of a pressure drop between the lift cylinder assembly and the pressure sensor, the payload measurement system being configured to determine the estimate of the pressure drop based on the temperature data, the extension velocity data and a mathematical model that has been fitted to empirical data relating to pressure loss between the lift cylinder assembly and the pressure sensor at different hydraulic fluid temperatures and lift cylinder assembly extension velocities.

15. The system of machine of claim 14 wherein the mathematical model has been fit to the empirical data using a regression analysis.

16. The machine of claim 14 wherein the payload measurement system determines the estimate of the weight of the payload from a table stored in the payload measurement system using the pressure data as adjusted by the pressure loss data.

17. The machine of claim 14 wherein the mathematical model uses an equation including:

$$\Delta P_O = \frac{\rho Q^2}{2C_d^2 \pi^2 R^4}$$

where $\Delta P_O$ is a pressure drop through a orifice between the pressure sensor and the lift cylinder assembly, $\rho$ is density of the hydraulic fluid, Q is the volumetric flow rate of the hydraulic fluid between the pressure sensor and the lift cylinder assembly, R is the radius of a hydraulic line between the pressure sensor and the lift cylinder assembly, and $C_d$ is a coefficient the value of which is determined by fitting the empirical data to the mathematical model.

18. The machine of claim 14 wherein the mathematical model uses an equation including:

$$\Delta P_L = \frac{8K_g \mu Q l}{\pi R^4}$$

wherein $\Delta P_L$ is a pressure drop through a line between the pressure sensor and the lift cylinder assembly, μ is the viscosity of the hydraulic, Q is the volumetric flow rate of the hydraulic fluid between the pressure sensor and the lift cylinder assembly, R is the radius of a hydraulic line between the pressure sensor and the lift cylinder assembly, l is the length of the line between the pressure sensor and the lift cylinder assembly, and $K_g$ is a coefficient the value of which is determined by fitting the empirical data to the mathematical model.

19. The machine of claim 14 wherein the mathematical model uses an equation including:

$$\Delta P_C = C$$

where $\Delta P_C$ is a pressure drop resulting from the pressure sensor, and

C is a coefficient the value of which is determined by fitting the empirical data to the mathematical model.

20. The machine of claim 14 wherein the pressure sensor is arranged adjacent a control valve for the lift cylinder assembly.

\* \* \* \* \*